US010337721B2

(12) United States Patent
Soken

(10) Patent No.: US 10,337,721 B2
(45) Date of Patent: Jul. 2, 2019

(54) ILLUMINATED CABLE COMBS

(71) Applicant: American Future Technology Corp., City of Industry, CA (US)

(72) Inventor: Bradley Soken, Glendale, CA (US)

(73) Assignee: American Future Technology Corp., City of Industry, CA (US)

( * ) Notice: Subject to any disclaimer, the term of this patent is extended or adjusted under 35 U.S.C. 154(b) by 0 days.

(21) Appl. No.: 15/990,985

(22) Filed: May 29, 2018

(65) Prior Publication Data

US 2018/0347804 A1    Dec. 6, 2018

Related U.S. Application Data

(60) Provisional application No. 62/512,642, filed on May 30, 2017.

(51) Int. Cl.
| | |
|---|---|
| F21V 33/00 | (2006.01) |
| F21V 23/00 | (2015.01) |
| F21V 23/04 | (2006.01) |
| H01B 17/00 | (2006.01) |
| H01B 17/66 | (2006.01) |
| H01B 7/00 | (2006.01) |
| H01R 25/00 | (2006.01) |
| G02B 6/44 | (2006.01) |
| G06F 1/16 | (2006.01) |
| G06F 1/18 | (2006.01) |
| H01B 11/20 | (2006.01) |
| H02B 1/20 | (2006.01) |
| F21Y 115/10 | (2016.01) |

(52) U.S. Cl.
CPC ........ *F21V 33/0004* (2013.01); *F21V 23/001* (2013.01); *F21V 23/04* (2013.01); *G02B 6/44* (2013.01); *G06F 1/1683* (2013.01); *G06F 1/18* (2013.01); *H01B 7/0045* (2013.01); *H01B 11/203* (2013.01); *H01B 17/005* (2013.01); *H01B 17/66* (2013.01); *H01R 25/003* (2013.01); *H02B 1/202* (2013.01); *F21Y 2115/10* (2016.08)

(58) Field of Classification Search
CPC .................................. G06F 1/18; G06F 1/183
USPC .......................................... 362/234; 439/449
See application file for complete search history.

(56) References Cited

U.S. PATENT DOCUMENTS

| 4,900,265 A | 2/1990 | Gridley et al. | |
|---|---|---|---|
| 2005/0124209 A1* | 6/2005 | Currie | H01R 13/7172 439/490 |
| 2009/0086469 A1 | 4/2009 | Hutchinson et al. | |
| 2011/0045689 A1* | 2/2011 | Tsai | G06F 1/18 439/490 |

(Continued)

OTHER PUBLICATIONS

World Intellectual Property Organization, International Search Report and Written OPinion for INternation Application No. PCT/US2018/ 034853, dated Sep. 3, 2018, pp. 1-39.

*Primary Examiner* — Christopher M Raabe
(74) *Attorney, Agent, or Firm* — Socal IP Law Group LLP; Jonathan Pearce

(57) ABSTRACT

There is disclosed an illuminated cable comb including a body incorporating at least two openings for removably retaining a corresponding at least two cables in a fixed position relative to the body. The comb further includes a light source within the body, and conductive material within the body capable of transmitting power to the at least one light such that the at least one light illuminates the body when power is supplied.

20 Claims, 9 Drawing Sheets

(56) References Cited

U.S. PATENT DOCUMENTS

2012/0287569 A1\* 11/2012 Santos .................... G06F 1/183
                                                                        361/679.32
2016/0226199 A1\* 8/2016 Zhou .................. H01R 13/7172

\* cited by examiner

ILLUMINATED CABLE COMBS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from U.S. provisional patent application No. 62/512,642 entitled "Illuminated Cable Combs" filed May 30, 2017.

BACKGROUND

Field

This disclosure relates to the organization and retention of the wiring inside a personal computer, server computer, or other electronic device using a cable comb while simultaneously incorporating lighting for the cable comb.

Description of the Related Art

Computer innards and components, particularly among computer and computer gaming enthusiasts, have increasingly become an expression of one's personality and overall interest in the gaming community. Avid computer gamers often spend time and money customizing the interior and exterior of their computer cases for dramatic effect or for aesthetic purposes. Though these aesthetic considerations seldom add to the performance or actual substance of a given computer, serious gamers spend sufficient time in close proximity to their computers that they view the computer to be an extension of their personality or self-expression.

The general consensus among gaming enthusiasts who take great care in making their computers expressions of their personality is that wires running here and there throughout a computer case are unsightly and demonstrate a lack of care about the computer. However, wires of various types are crucial to the function of modern computers. Wires are direct power to different components such as motherboards, fans, and disk drives. Wires direct control signals to components. As an unfortunate side-effect of adding components for aesthetic purposes only, this only increases the already-prevalent number of wires from those that are necessary to cause the computer to function (e.g. power supply, hard drive connectors, etc.) to include still-more wires (e.g. power for lighting effects, control wires for lighting effects that change colors).

If the wires are unkempt, they look unsightly, may become tangled and in a transparent or see through computer box be very aesthetically displeasing. Furthermore, computer enthusiasts often like to swap out older components for higher-performance components. If wires are unkempt, it can be difficult to identify which wires go to what component or multiple sets of wires may become entangled, thus making it harder for users to identify what they need to unplug. Having wires organized can give a "clean" and "sterile" look to the interior of someone's computer.

Since the early to mid 1990s, "gaming" PCs (personal computers) have become increasingly popular. These PCs are often painted in dramatic ways, including flames, emblems, or colors not typical in traditional office computers. Additionally, sometimes computer users like a "clean" or "sterile" look in which the inside components are neatly organized. This look is both aesthetically pleasing to some and also makes it easier to identify and change computer components. Also, these computers can use lighting in interesting ways, such as buttons backlit in bright colors, or lighted system readouts with details regarding the operating temperatures and hard drive access visible from the exterior of enclosures.

Further, the use of the transparent or translucent cutouts along one or more panels of the computer can be placed so that the interior may be viewed. Exterior observers are able to see the interior of the enclosure where the electronics were present. A knowing observer might quickly determine the type and model of components within the enclosure, similar to an automotive specialist looking over an engine and noticing performance parts and being impressed, much like 1950's era hot-rodders might inspect each other's engine compartments before a race. If wires are strewn everywhere and disorganized, an onlooker might think the owner does not care about keeping an aesthetically-pleasing computer, or is not dedicated enough to really care about their computer. Colors may be selected or available for aspects of various components to create an overall scheme (e.g. most components are colored white or black or red).

Computer component designers have taken this one step further in recent years, dramatically advertising the make and model of components, either visibly on the component, or sometimes even with lighted effects touting a particular brand and model. High-end graphics cards, for example, often include LED lighting and are shipped with a particular color "on" (perhaps the brand-associated color for the graphics card—e.g. green for Nvidia® or red for AMD®), but including small application programs that operate on the associated computer and enable the end-user to select the color of the LED. Still more recently, motherboards manufactured by particular component manufacturers incorporate "leads" that enable manufacturers of so-called RGB components (a reference to "red-green-blue" used to describe monitors, but here meaning that they are capable of many colors) to simultaneously control all connected lights using built-in hardware and software that simultaneously communications with all components joined to these leads. This feature is important for users who have a particular color "scheme" in mind for their computer, but want a particular component. These users do not want to ruin their overall design just by buying one desired, new component.

Cable combs exist in the art to help users to manage and organize wiring within computer cases and other electronics cases. Similar functionality is provided for large-scale networking projects which involve hundreds or thousands of ethernet or fiber optic cables. These cables may be "grouped" and neatly maintained within "cable combs" which separate, but maintain neatly, numerous cables. These are most effective when it is known how many cables will be used in a particular component (e.g. commercial-grade networking routers often incorporate either 24 or 12 ports. So, a corresponding cable comb may incorporate 12 or 24 cavities between 25 or 13 teeth to grasp and hold in a fixed position, but subject to being rearranged as needed, the 24 or 12 cables. The use of cable combs is favored for enhancing the neatness of the overall network system (or interior of a computer) and by enabling replacement of one or more cables without tangling or difficulty in discovery which cable is which.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Figure 1:
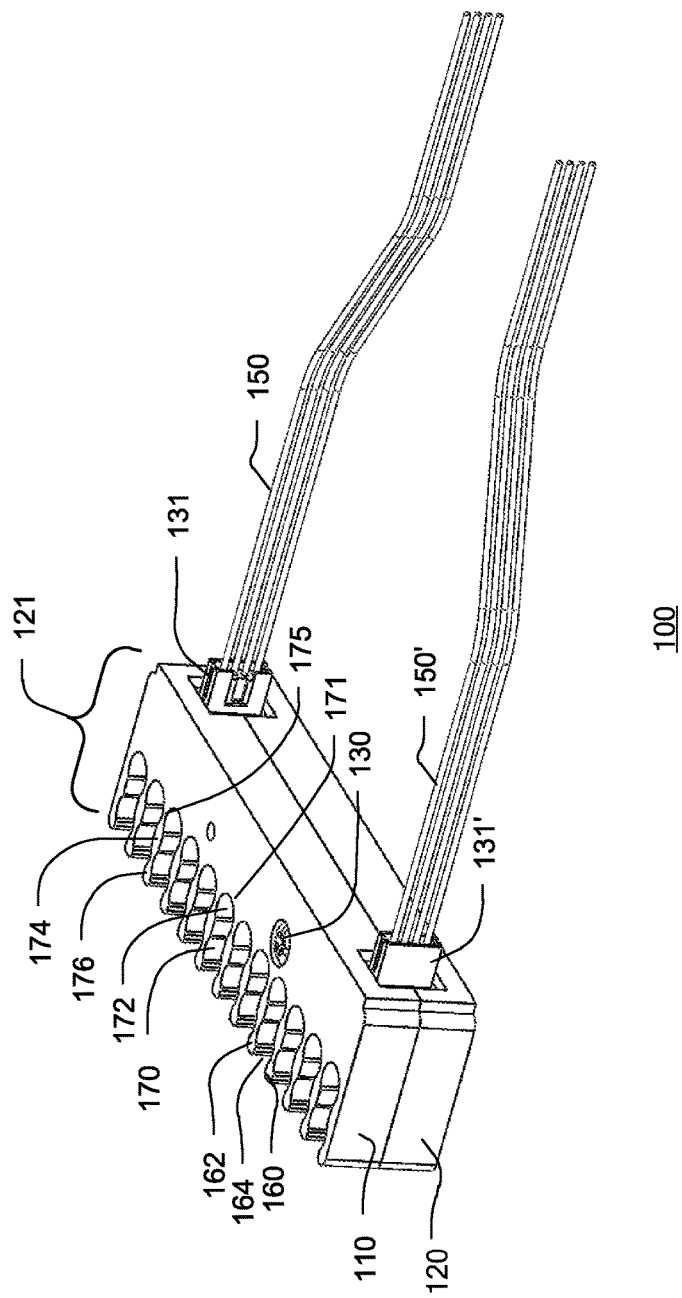
FIG. 1 is a top, perspective view of an illuminated cable comb.

Turning first to FIG. 1, a top, perspective view of an illuminated cable comb is shown. This comb 100 includes a comb body 121 defined by an upper 110 and lower 120 portion. Though shown as two distinct portions 110 and 120, the cable comb may be designed as a single component, for example an injection molded plastic into which components may be inserted or molded around the components themselves (e.g. a light source). It may be easiest, from a manufacturing perspective, to make the components two individual portions 110 and 120, as shown in FIG. 1

The two portions are combined by at least one fastener 130. In FIG. 1 the fastener 130 is a screw with corresponding threading in the lower portion 120 (not visible). However, the fastener 130 may take many forms. In some cases, the fastener 130 may be corresponding male and female clips, or tabs, may be Velcro®, snaps, buttons, or other fasteners commonly used to hold two or more mechanical components together.

Wires 150 may provide electricity from an external source to a light source within the comb body 121. Though wires 150 are shown, only some conductive material must be used. The form that conductive material takes may vary.

The wires 150 running to the comb body is a Molex wire terminated in a Molex connector at an end (not shown) which terminates in a connector 131 in the comb body 121 at its other end. While connector 131 may be a Molex wire, in other cases connector 131 could be for other power sources such as a specifically-designed RGB lead (described above), USB, or other connector types. Port 131 could also, instead, be uncovered metal wire to be soldered, twisted, crimped or otherwise physically connected to wires 150 to provide power. This connector 131 draws power to the light source (not shown) within the comb body 121. Preferably, wires 150 are available from a power supply or other computer component or wire that within the computer. Occasionally, the appropriate power supply is "split" off of the power supply for another component.

The wires 150 may incorporate more than merely a power supply source for the light source. The wires 150, especially in cases in which RGB leads are available on a motherboard or other controller board, may also incorporate signal wires indicative of a desired color (or color scheme or change of colors) for the light source (not shown) within the comb body 121. Specifically, one or more of the wires 150 may direct the light source within the comb body 121 to alter its color to one or another color, to alternate between multiple colors, or to otherwise function according to exterior direction from the motherboard or other control board internal to the computer. These signals may, in turn, be generated by software operating on the computer. The associated signal wire or wires may be incorporated into the wires 150.

The wires 150' and connector 131' are the corresponding "exit" ports to enable the cable comb 100 to complete the circuit. These wires 150' and connection port 131' may also act as a daisy-chain to other, nearby cable combs so that other components may also receive power and signals related to the desired colors for the light sources therein or connected to the cable comb 100.

As mentioned above, it is often desirable to have the coloration of components match one another. So, receipt of corresponding signals, when passed from device to device, is desirable. Similarly, the available leads for such signals are typically limited on a motherboard to between two to four. The "daisy chain" connection type enables multiple devices to connect to a single lead.

Preferably, the material of the comb body 121 is a shade of white or translucent white or clear polymer, plastic, acrylic, glass, or other transparent or translucent material. This enables the light source's color to be altered, as desired, by suitable software for controlling the color of the light source (e.g. LEDs capable of multiple colors). However, in some cases, the material used to make comb body 121 may be of a specific color or tint. Thus, when the light source shines through the comb body 121 the color emitted may be of the color of the specific comb body 121. For example, if the body is made from a blue plastic and light shines through, it may make the comb appear to illuminate blue light. Different combinations of emitted light and body color may create even emit even different color combinations. For example, if the body is blue and the LED is red, it may make the comb appear purple in color. Different comb body colors and different light arrays can be combined to create desired colors and effects.

The illuminated cable comb has at least two teeth, 160 and 162, protruding from comb body 121. Tooth 160 and 162 are sufficiently close, yet distant from one another to form gap 164. This configuration is repeated as many times as needed to form enough gaps, like gap 164, to accept the cables that will be passed through the teeth 160 and 162. In FIG. 1, there are 13 teeth, however other embodiments can either have more or less than 13 teeth.

Gap 164 is but one gap where the cables (or wires) being organized will be placed. In some embodiments the gap may be further segregated into multiple channels. For example, channel 170, is in front of channel 172, both in gap 171. Expansion 174 and Expansion 176 on tooth 175—which may be on both sides of tooth 175—creates these channels, like channels 170 and 172. As shown, there are two channels and two expansions in this cable comb 100. However, more expansions can be added to different teeth to create even more channels. Virtually any number of corresponding expansions and channels may be added, though at more than 6 or 10 channels, inserting and removing cables from the comb 100 may become cumbersome and difficult.

These channels, such as channels 170 and 172, exist to accept insertion of multiple cables that must be stored in parallel to one another. The gaps in FIG. 1 only have two channels each; however more channels could be added. The channels may be of different diameter to fit wires of different widths. The channels may be of the same diameter to fit cables of the same diameter. The channels may be configured to make two or more distinct areas of compression and relaxation for each of the cables placed within the at least two openings (e.g. channels and expansions). In another embodiment a first channel and second channel are configured to frictionally, and removably, hold an inserted cable.

Likewise, various widths of cable comb 100 are envisioned. Cable groupings of few as two or four (four across, or two-by-two, but double depth) are common. Likewise, a two-by-six and a two-by-eight configuration of cables are common in computer graphics card power supply cables. The most common is the ATX (and variations for ITX and micro-ITX) power supply cables that provide power to the motherboard. The ATX is a two-by-twelve configuration. An older style uses a two-by-ten configuration. Other variations varying from one-by-two, up to two-by-twenty or even higher are possible. As should be expected, corresponding cable combs, like cable comb 100 are possible as well to contain these cable configurations.

Preferably, cables or wires may be inserted and removed as desired, but, once inserted, remain relatively fixed. The engagement may be frictional, as suggested above. Removal and insertion both may be impeded by the expansions. The channels correspondingly, are designed in such a way that cables or wires will sit within them without being compressed. As a result, cables or wires are unlikely to become dislodged from the cable comb 100 without intervention by a human who desires the cables or wires to be removed from the comb 100.

In some cases, the colors of the lights can change while in operation. Alternatively, a static color can be used (e.g. a red LED will only give off a red light) however in other embodiments multiple colors can be used. Sometimes these colors can change based on how a user elects to instruct them to change using corresponding software. For example, a light source in the comb can be configured to change colors every three minutes based upon a time interval input by a user into suitable control software. Or, a light source may be instructed to continuously change colors or to transition between two or more colors on a regular schedule.

In some cases, the lights can change based on the condition of the computer. For example, if a user is using a large amount of CPU processing power and the computer is getting hot, the lights may all turn red, whereas if the computer is not being used very taxingly, the lights may turn blue or green or another color. The cable combs may be programmed to change color based on an activity of a user. For example, if a user installs an NVIDIA graphics card, during setup of drivers for the card, the combs may appear to pulsate green or turn green (Green is a color associated with NVIDIA). If a user installs an AMD graphics card, the combs may pulsate red or stay red. As indicated above, a single controller or multiple controllers may operate all of the associated light sources within a computer to ensure that they operate in a corresponding manner.

Figure 2:
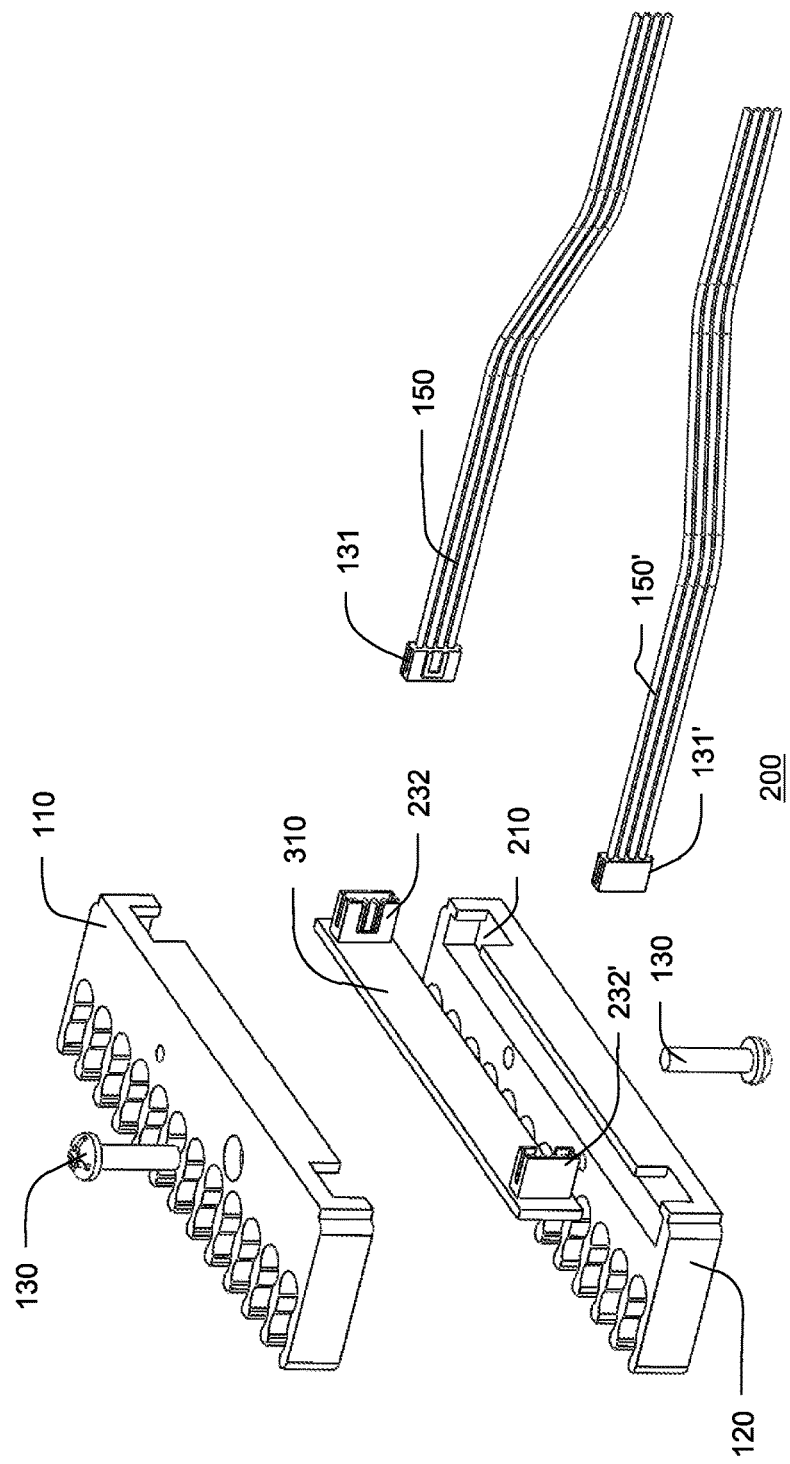
FIG. 2 is a rear, exploded view an illuminated cable comb.

Turning to FIG. 2, a rear, exploded view an illuminated cable comb 200 is shown. The comb 200 includes fastener 130, now with corresponding lower fastener 130 also visible. Also visible in this figure are ports 232 and 232' for connectors 131 and 131'. These ports 232 and 232' may be specifically designed to accept the connectors 131 and 131'. Or, the ports 232 and 232' may correspond to suitable lead wires that terminate in a motherboard or other controller. Preferably, these ports 232 and 232' provide both power and signaling interfaces so that the color or operation of the light source 310 may be controlled.

As shown in this view, the cable comb 200 includes a comb cavity 210. In this case, the comb cavity 210 is made up of a top and bottom half, with one half in each of the upper portion 110 and lower portion 120. The comb cavity 210 is designed to incorporate a light source 310. The comb cavity 210 may be of various sizes and shapes, corresponding to the size and shape of the cable comb 200 itself. Whatever size and shape the cable comb 200 is, the cavity 210 is designed to incorporate a corresponding light source 310. The light source 310, may be a single light (e.g. a bar, CFL light). In other cases, the light source may be an array of LED lights. Further, in other cases, there may not even be a cavity and the lights may just be molded directly into the comb 200 itself as a part of the comb body.

Figure 3:
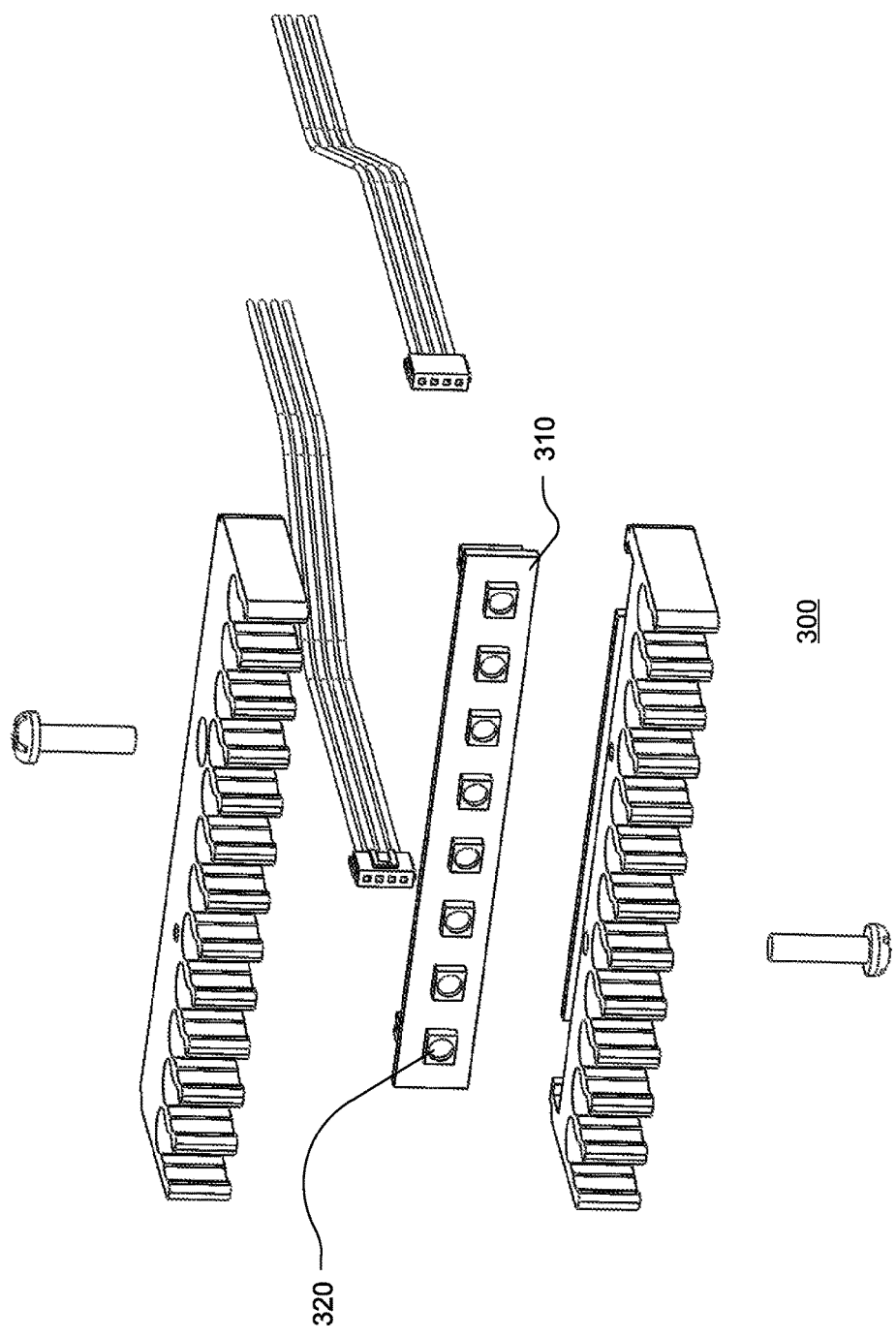
FIG. 3 is a frontal, exploded view of an illuminated cable comb.

FIG. 3 is a frontal, exploded view of an illuminated cable comb 300. The various components discussed in earlier figures will not be re-discussed here. However, in this view, individual lights 320 within the light source 310 may be seen. Here, there are a series of eight lights, illuminating a 12-wire cable comb 300. The 12-wire comb is double-depth (each tooth has two corresponding expansions and channels), so it can accommodate 24 cables or wires.

More than eight lights may be included in the light source 310. Or, fewer may be included in the light source 310. Preferably, only so many lights are incorporated to adequately illuminate the cable comb 300 while not adding unnecessarily to manufacturing costs.

As can also be seen, the lights, such as light 320, face "forward" toward the teeth of the cable comb 300. This is because this particular type of cable comb 300 is designed to have its ports and wires 150 hidden in the "back" of the comb 300. As can be appreciated, adding still more wires to a computer case where few visible, and well-organized cabling and wires is strongly preferred, can have the effect of making the interior of the case still less aesthetically pleasing. In order to deal with this, the wires leaving this comb 300 are designed to be hidden behind the organized cables themselves. As a result, no illumination is required "behind" the cable comb 300. That area will not be visible in most cases. However, as will be discussed more fully below, there are cases in which cables will be organized on both sides of a cable comb 300 with corresponding illumination being provided on both sides.

Figure 4:
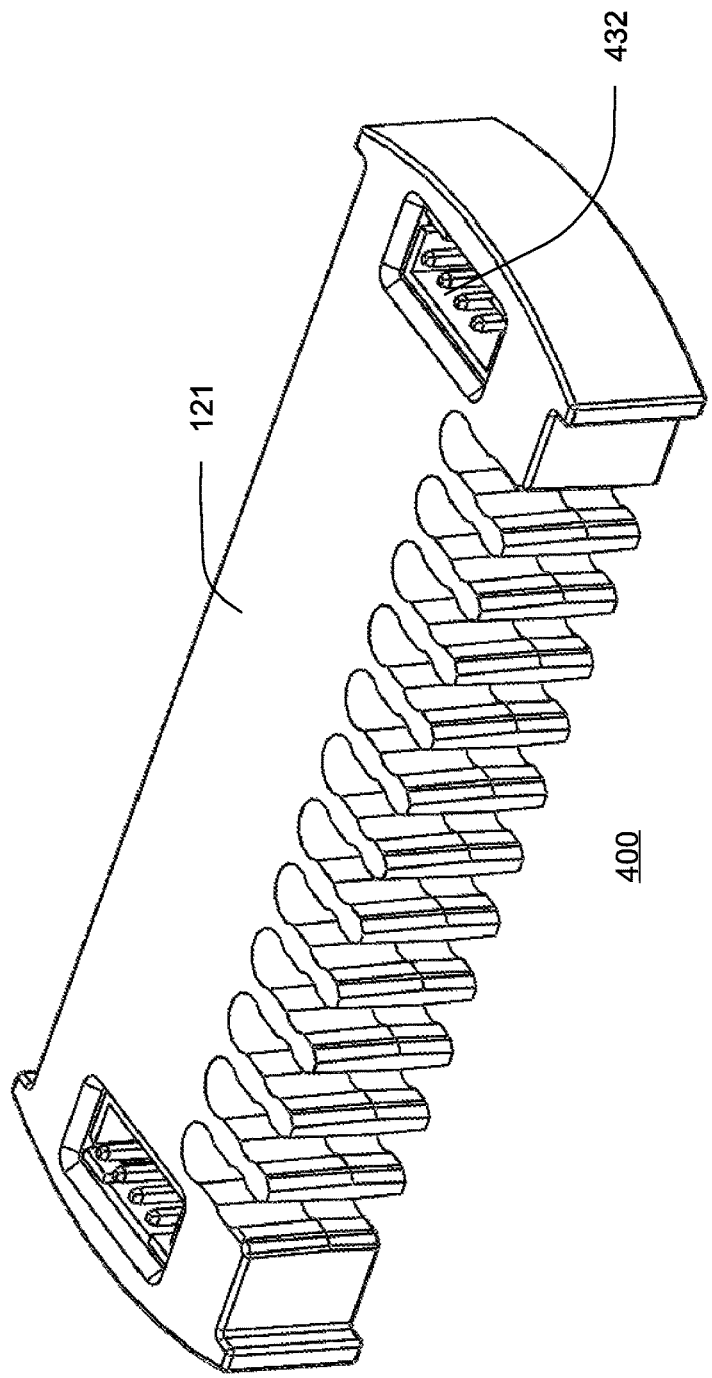
FIG. 4 is a bottom view of an illuminated cable comb.

Turning to FIG. 4, a bottom view of an illuminated cable comb 400 is shown. In some cases, it may be undesirable to have the connection port 410 or ports at the back of the comb 400. In FIG. 4, the connection port 432 is actually on the bottom of the comb 400. In other embodiments it may be on the top, front or one of the sides of the comb 400. These types of comb 400, and more generally the selection of where to place the port 432 will vary based upon the location least-likely to be visible to an exterior viewer of the cable comb 400. For this comb 400, likely intended to be mounted near the bottom of a computer case, that is the "bottom" of the comb, such that the wires entering the connection port 432 may not be visible from above and in front of the comb wen installed.

Figure 5:
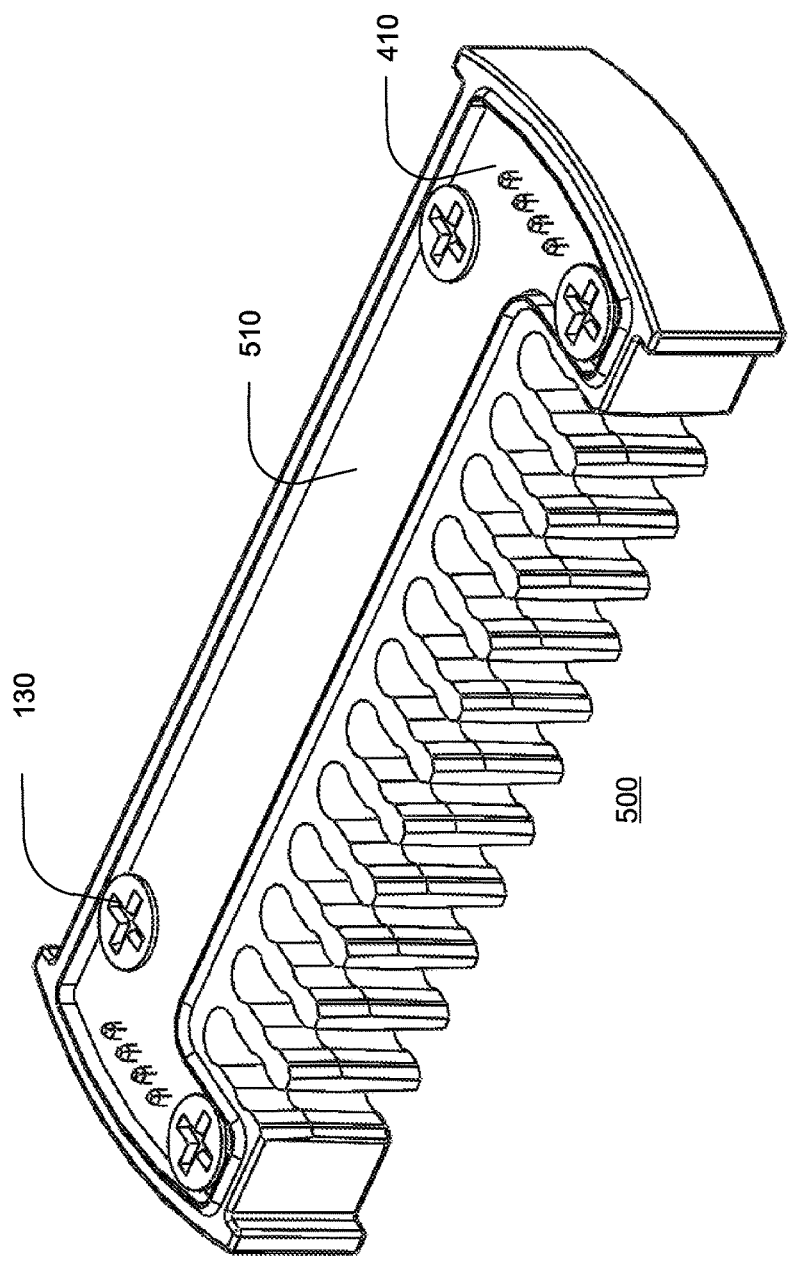
FIG. 5 is another bottom view of an illuminated cable comb with a bottom panel removed.

Turning to FIG. 5, another bottom view of an illuminated cable comb with a bottom panel removed is shown. As seen here, the cable comb may have a rather large light source 410, that is covered, partially by the base of the light source 410 itself. This light source 410 may be attached directly to the comb 500 by fasteners, like fastener 130. Here, these fasteners are screws, but other fastener types may be used.

Figure 6:
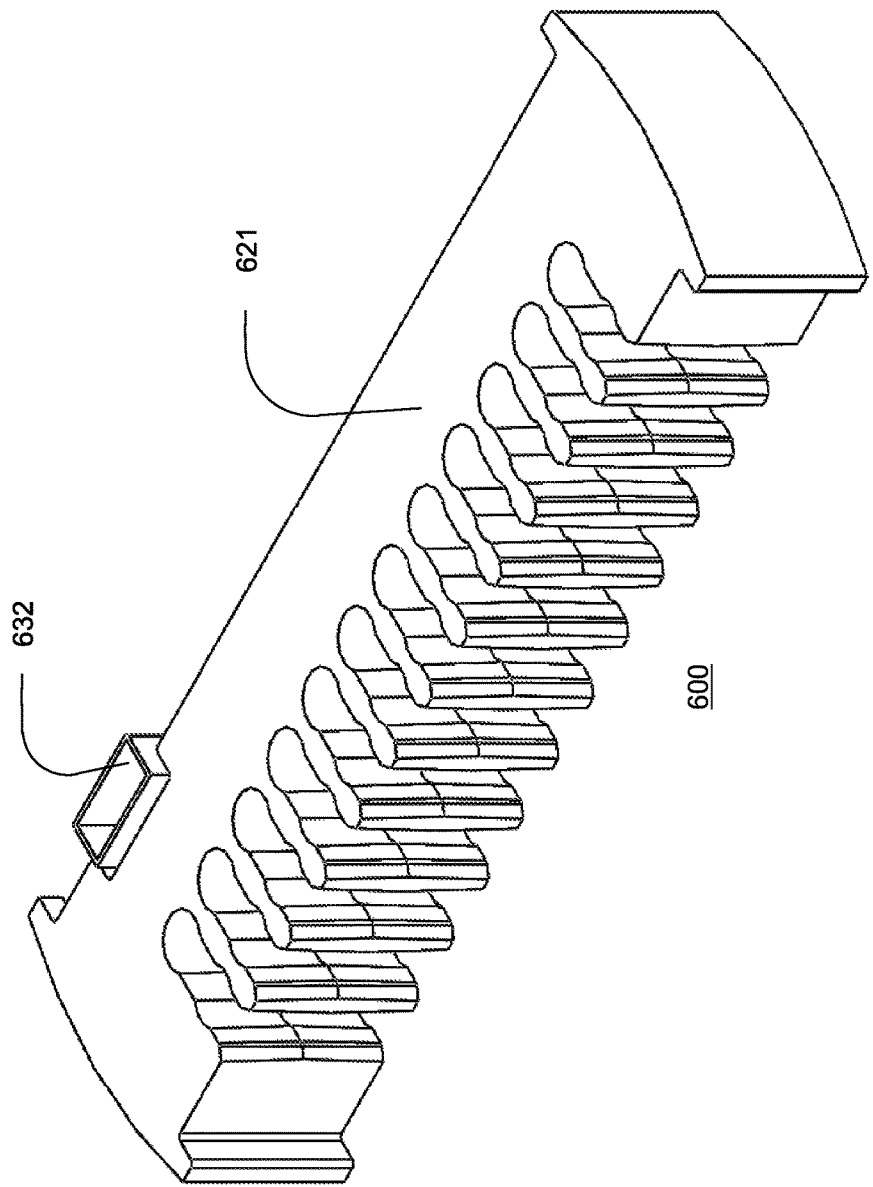
FIG. 6 is a top, perspective view of a different illuminated cable comb.

Turning to FIG. 6, a top, perspective view of a different illuminated cable comb 600 is shown. Here, connection port 632 is on the "back" of the cable comb 600, but the connector angle is upward, toward the top of the cable comb body 621. This angle allows the connector to even more easily be hidden behind cables within the cable comb which will extend upward and downward through the teeth of the comb 600, once the comb 600 is in place. As discussed briefly above, the connection ports 632 may be arranged on different parts of the comb 600 for a desired esthetic affect.

Figure 7:
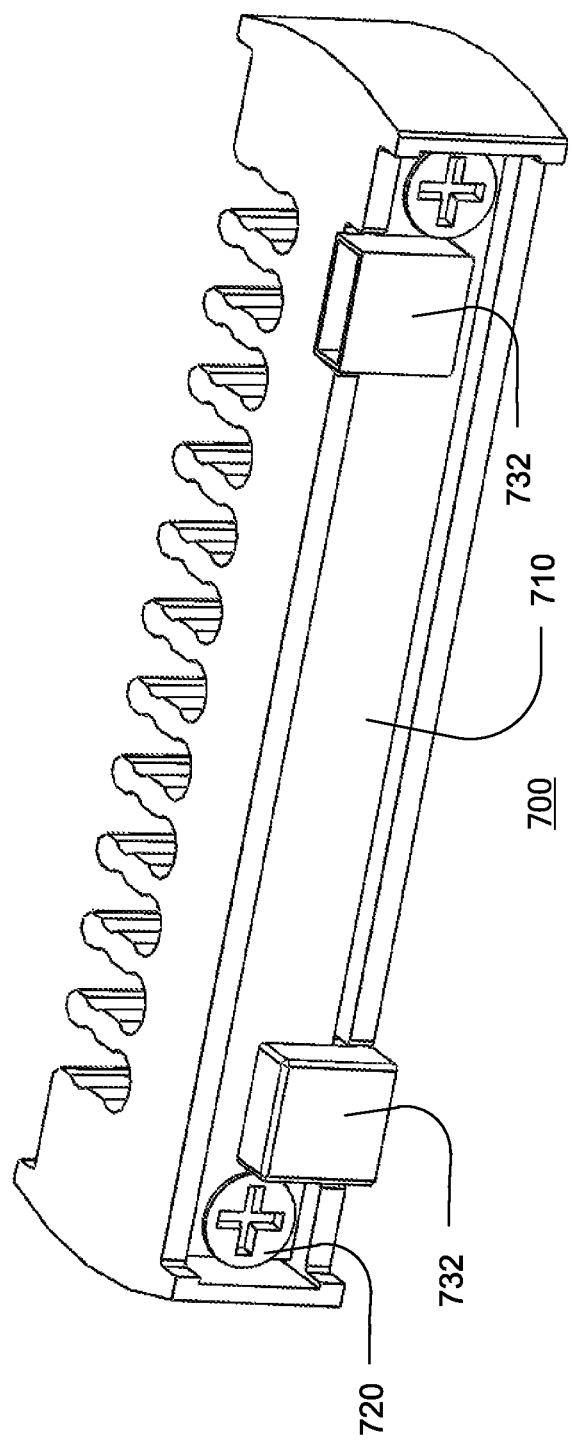
FIG. 7 is a back, perspective view of a different illuminated cable comb.

Turning to FIG. 7, a back, perspective view of a different illuminated cable comb 700 is shown. This comb 700 may be the same as that shown in FIG. 6. In such a configuration, the cavity to store an array of lights may be enclosed within a back cover 710. This allows a user to customize the comb by inserting their own array of lights or allows for simpler manufacturing by having a single molded piece, with a separate combined light source and cover to cover the only cavity. A series of port connectors 732 and 732 may extend toward the top and bottom of the comb 700. In some embodiments the back cover 710 may slide in place, may be held in place with friction snaps, buttons or other attachment systems. However, in other embodiments back comb cover fasteners 730, such a screws, may be needed.

Figure 8:
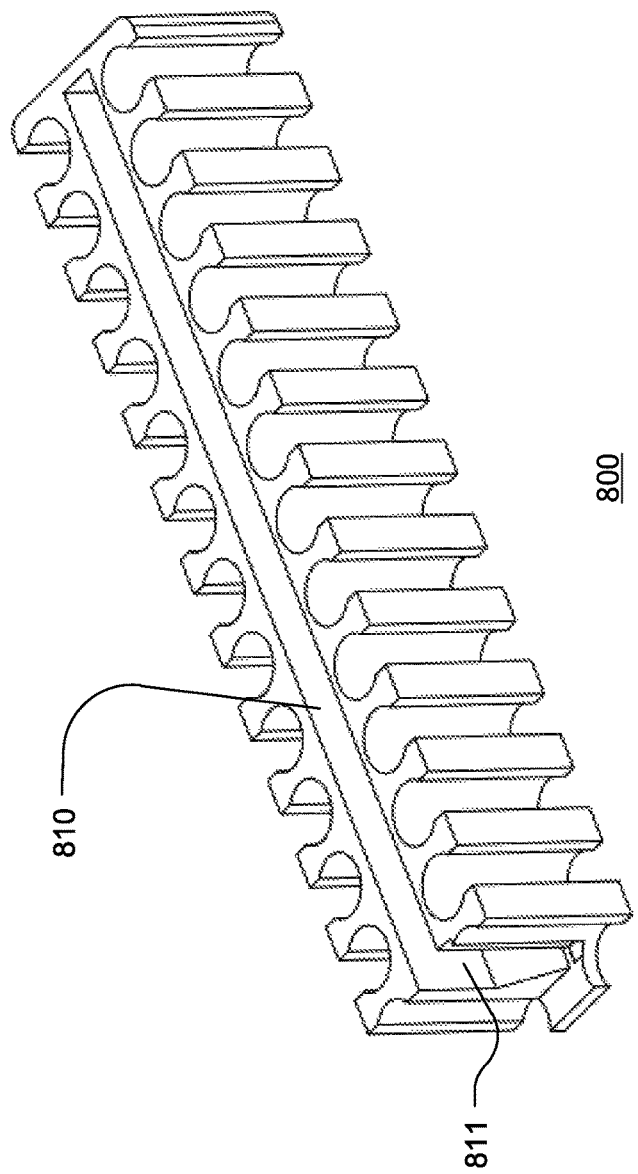
FIG. 8. is a cutaway view of yet another illuminated cable comb.

Turning to FIG. 8, a cutaway view of yet another illuminated cable comb 800 is shown. Here, a light source (not shown) may be fitted into the interior of the comb 800. In one embodiment 800, a body cavity 810 is cut (or molded) into the comb body and can fit a light source of corresponding size. Connectors, may be passed through a gap 811 in the end of the comb 800. In this embodiment, rather than shine through the comb 800 in a single direction, the light source may be multiple-sided to correspond to the multi-sided nature of the cable comb 800.

In the case of an LED array, LEDs may be arranged on either side of a mounting circuit board. In the case of a CFL light source, a single CFL bar may be inserted into the comb 800 without shielding such that it shines in all directions within the cavity 810.

Figure 9:
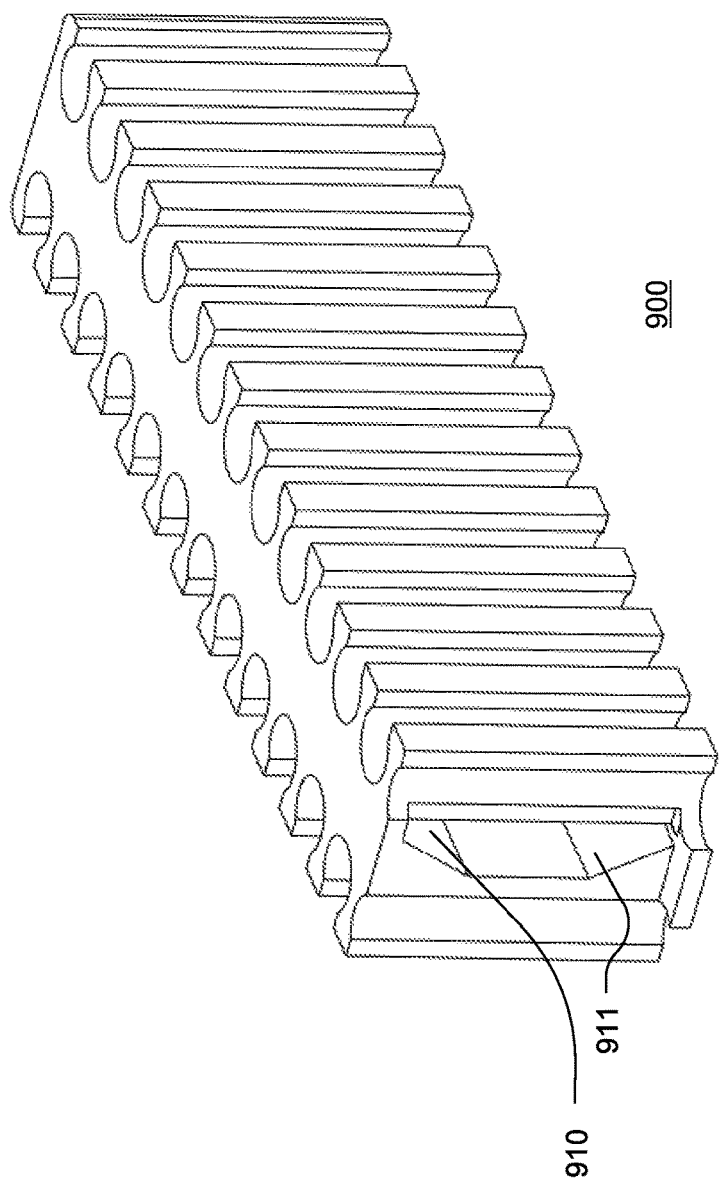
FIG. 9 is full view of the illuminated cable comb of FIG. 8.

Turning to FIG. 9, a full view of the illuminated cable comb 900 of FIG. 8 is shown without the cutaway. Here, a user may be displeased by the fact that so many cables have to be run to power and control the array of lights in the cable comb. For example, if a cable comb is being used to organize 24 computer cables, but then 4 more cables need to be added to power the cable comb lights, the set up may begin to appear aesthetically unpleasing. Cavity 910 solves this problem by having enough room to store an array of lights, but also is only on one side of the cable comb 900. That way, when the cable comb is used, the side where the additional cable comb wires must stick out can be placed only in the gap 911 that is placed within a computer case in such a way as to be out of view of people looking into the computer case.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An illuminated cable comb comprising:
   a body incorporating at least two openings for removably retaining a corresponding at least two cables in a fixed position relative to the body;
   at least one light within the body; and
   conductive material within the body capable of transmitting power to the at least one light such that the at least one light illuminates the body when power is supplied.

2. The illuminated cable comb of claim 1 wherein the at least one light is a single light selected from the group comprising LED, CCFL, and incandescent.

3. The illuminated cable comb of claim 2 wherein the plastic base consists of 33 teeth.

4. The illuminated cable comb of claim 1 wherein the at least one light is an array of lights.

5. The illuminated cable comb of claim 1 wherein the body is comprised of a transparent or translucent plastic, acrylic, or glass.

6. The illuminated cable comb of claim 1 wherein a color of the at least one light may be changed to thereby alter the illumination of the body.

7. The illuminated cable comb of claim 1 wherein the comb is made from a material selected from plastic, acrylic, ABS plastic, glass, or a translucent polymer.

8. The illuminated cable comb of claim 1 wherein the array of lights consists of at least one LED.

9. The illuminated comb of claim 1 wherein the array of lights consists of at least one CFL.

10. The illuminated cable comb of claim 1 wherein the component connecting the lights to power is a standard MOLEX wire.

11. The illuminated cable comb of claim 1 wherein the component connecting the lights to power is a metal wire of any conductance.

12. The illuminated cable comb of claim 1 wherein the component connecting the lights to power is a standard USB wire.

13. The illuminated cable comb of claim 1 wherein the power to run the lights is obtained from the computer cables running through or near the comb.

14. The illuminated cable comb of claim 1 wherein the gap formed between the at least two teeth creates at least two openings for at least two cables.

15. The illuminated cable comb of claim 1 wherein the gap formed between the at least two teeth creates at least two openings for at least two cables and the at least two openings get progressively smaller in diameter as the openings approach the cable come body.

16. The illuminated cable comb of claim 1 wherein the comb contains a switch for turning the lights on or off.

17. The illuminated cable comb of claim 1 wherein the comb contains a control module for changing the color of the lights.

18. An illuminated cable comb comprising:
- a body with at least two teeth protruding therefrom, wherein each of the at least two teeth incorporate an opening suitable for removably retaining an electrical cable;
- a cavity within the body incorporating an array of lights; and
- conductive material within the cavity capable of carrying power to the array of lights and comprising an external link to a power source.

19. The illuminated cable comb of claim 18 wherein the fastener component from the upper and lower portion is combined to create at least one hole for at least one screw and threading for at least one screw.

20. An illuminated computer cable comb comprising:
- a plastic body consisting of an upper and a lower portion;
- the upper and lower portion containing at least one corresponding fastener component to fashion the two portions together;
- the upper and lower portion each containing at least two teeth;
- the upper and lower portion containing a cavity with enough room for at least one light and wiring to power the light;
- the upper and lower portion containing at least one opening suitable for housing and exiting wiring for the lights to a power source separate from the illuminated computer cable comb.

* * * * *